United States Patent
King et al.

(10) Patent No.: US 9,062,133 B2
(45) Date of Patent: Jun. 23, 2015

(54) PROCESS FOR BROMINATING BUTADIENE POLYMERS USING MIXED SOLVENTS

(75) Inventors: Bruce A. King, Midland, MI (US); John W. Hull, Jr., Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 148 days.

(21) Appl. No.: 13/817,447

(22) PCT Filed: Sep. 19, 2011

(86) PCT No.: PCT/US2011/052114
§ 371 (c)(1),
(2), (4) Date: Feb. 17, 2013

(87) PCT Pub. No.: WO2012/044482
PCT Pub. Date: Apr. 5, 2012

(65) Prior Publication Data
US 2013/0178589 A1    Jul. 11, 2013

Related U.S. Application Data

(60) Provisional application No. 61/388,265, filed on Sep. 30, 2010.

(51) Int. Cl.
*C08F 8/20* (2006.01)
*C08F 8/18* (2006.01)
*C08C 19/12* (2006.01)
*C08F 8/22* (2006.01)

(52) U.S. Cl.
CPC ... *C08F 8/20* (2013.01); *C08F 8/18* (2013.01); *C08C 19/12* (2013.01); *C08F 8/22* (2013.01); *C08F 2800/20* (2013.01)

(58) Field of Classification Search
None
See application file for complete search history.

(56) References Cited

U.S. PATENT DOCUMENTS

| 4,381,374 A * | 4/1983 | Hillman ................ 525/356 |
| 8,202,945 B2 | 6/2012 | King |
| 8,304,492 B2 | 11/2012 | Greminger |
| 2011/0021715 A1 | 1/2011 | Gorman |

FOREIGN PATENT DOCUMENTS

| WO | 2008/021417 A | 2/2008 |
| WO | 2009/126531 A | 10/2009 |
| WO | 2009/139942 A | 11/2009 |
| WO | 2010/080286 A | 7/2010 |

* cited by examiner

*Primary Examiner* — Robert C Boyle
(74) *Attorney, Agent, or Firm* — Gary C Cohn PLLC

(57) ABSTRACT

Butadiene polymers are brominated using a quaternary ammonium or quaternary phosphonium tribromide as the brominating agent. The bromination is performed in a solvent mixture than contains at least one polyhalogenated alkane and at least one monohalogenated alkane. The process proceeds easily under mild conditions and allows high conversions to be achieved easily.

9 Claims, No Drawings

PROCESS FOR BROMINATING BUTADIENE POLYMERS USING MIXED SOLVENTS

This application claims priority from U.S. Provisional Application No. 61/388,265, filed 30 Sep. 2010.

The present invention relates to a process for brominating a butadiene homopolymer or copolymer, such as a brominated block, random or graft copolymer of styrene and butadiene.

WO 2008/021417 describes a process for brominating a butadiene polymer. The brominating agent is a phenyltrialkylammonium tribromide, benzyltrialkylammonium tribromide or tetraalkylammonium tribromide. The process is conducted with the starting polymer in solution. A highly selective bromination of aliphatic carbon-carbon double bonds is achieved, leaving any aromatic rings that may be present such as in polystyrene-polybutadiene block co-polymers essentially unaffected.

Various modifications of the process described in WO 2008/021417 are described in WO 09/126531, WO 09/134628, WO 09/139942 and WO 10/017134.

A potential use for the brominated polymer is as a flame retardant additive for thermoplastic polymers such as polystyrene. The thermal characteristics of the brominated polymer are very important in that application. The thermoplastic polymer is typically blended with the brominated polymer in a melt blending process. The blend is in most cases simultaneously or subsequently melt processed to form a fabricated product. For example, the blend can be melt processed by extruding it to form foamed or unfoamed articles by injection molding, by melt casting, or by other processes that involve melting the blend in order to convert it into the desired product form. The brominated polymer must be heat-stable at the temperatures encountered during the melt blending and melt processing operations. In addition, the brominated polymer must be able to decompose under fire conditions to liberate bromine or hydrogen bromide. If the brominated polymer is too heat-stable, it does not decompose at the correct temperature and is ineffective as a flame retardant. It has been found that a brominated polybutadiene copolymer can have the thermal characteristics that are needed for the flame retardant applications, if it is prepared carefully by minimizing certain side reactions. The process described in WO 2008/021417 produces a brominated polybutadiene copolymer having the desired thermal characteristics.

The bromination reactions described in WO 2008/021417, WO 09/126,531, WO 09/134628, WO 09/139942 and WO 10/017134 are performed in solution. Various solvents are described, including halogenated alkane solvents such as dichloroethane, chloroform, dibromomethane and bromochloromethane. It has been found that when the bromination is performed in these halogenated solvents, the partially brominated polymer tends to separate into a highly concentrated phase. The quaternary ammonium tribromide brominating agent tends to be excluded from this phase, often coming to reside instead in a second organic phase that contains a much lower concentration of the partially brominated polymer. As a result, the partially brominated polymer becomes separated from the brominating agent, and bromination reaction tends to slow down or terminate prematurely. This problem can be overcome somewhat through thorough mixing, but this increases energy costs and at commercially reasonable mixing conditions is not very effective. Therefore, an alternative approach to conducting the reaction is desired.

The present invention is in one aspect a process for forming a brominated butadiene polymer comprising reacting a butadiene polymer containing aliphatic carbon-carbon double bonds with a quaternary ammonium tribromide or quaternary phosphonium tribromide, in the presence of a solvent mixture containing at least one polyhalogenated alkane or halogenated aromatic compound in which the brominated butadiene polymer is soluble, and at least one monohalogenated alkane, to form a solution of the brominated butadiene polymer in the solvent mixture and a quaternary ammonium monobromide salt or quaternary phosphonium monobromide salt as a by-product.

The partially brominated polybutadiene polymer tends not to form a highly concentrated phase that excludes the tribromide brominating agent, when a solvent mixture as described herein is used as the process solvent. Therefore, the bromination continues at good rates and to higher conversions, than when polyhalogenated alkanes such as dichloroethane, chloroform, dibromomethane or bromochloromethane or a halogenated aromatic compound is used as the process solvent. This invention reduces the need to strongly agitate the reaction mixture in order to maintain good reaction rates and conversions.

A polymer of butadiene is the starting material in this process. The butadiene polymer may be a homopolymer or a copolymer of butadiene and one or more other monomers. A copolymer may be a random, block or graft copolymer, and should contain at least 10% by weight of polymerized polybutadiene. Butadiene polymerizes to form two types of repeating units. One type, referred to herein as "1,2-butadiene units" takes the form

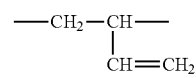

and so introduces pendant unsaturated groups to the polymer. The second type, referred to herein as "1,4-butadiene" units, takes the form —$CH_2$—$CH$=$CH$—$CH_2$—, and introduces unsaturation into the main polymer chain. The butadiene polymer should contain at least some 1,2-butadiene units. Of the butadiene units in the butadiene polymer, suitably at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the butadiene polymer. The proportion of 1,2-butadiene units may be in excess of 85% or even in excess of 90% of the butadiene units in the polymer.

Methods for preparing butadiene polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci.* A-2, 9, 43-57 (1971), J. Zymona, E. Santte and H. Harwood in *Macromolecules*, 6, 129-133 (1973), and H. Ashitaka, et al., in *J. Polym. Sci., Polym. Chem.*, 21, 1853-1860 (1983).

A preferred starting material is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene as well as compounds that are substituted on the ethylenically unsaturated group (such as alpha-methylstyrene, for example), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

"Vinyl aromatic units" are repeating units in the starting material that are formed when a vinyl aromatic monomer is polymerized. A suitable butadiene/vinyl aromatic starting copolymer contains from 5 to 90 percent by weight of polymerized vinyl aromatic monomer units and at least 10% by weight of polymerized butadiene.

A starting butadiene polymer may be a random, block (including multiblock such as diblock or triblock types) or graft type of copolymer. Styrene/butadiene block copolymers are widely available in commercial quantities. Those available from Dexco Polymers under the trade designation VECTOR™ are suitable. Styrene/butadiene random copolymers may be prepared in accordance with the processes described by *Polymer*, Volume 46, page 4166 (2005). Styrene/butadiene graft copolymers may be prepared in accordance with methods described by *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

The butadiene polymer may also contain repeating units formed by polymerizing monomers other than butadiene and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the butadiene, may be polymerized to form blocks, or may be grafted onto the butadiene polymer.

The most preferred type of butadiene polymer is a block copolymer containing one or more polystyrene blocks and one or more polybutadiene blocks. Among these, diblock copolymers and triblock copolymers having a central polybutadiene block and terminal polystyrene blocks are especially preferred.

The butadiene polymer has a weight average molecular weight ($M_w$) within a range of from 1,000 to 400,000, preferably from 2,000 to 300,000, more preferably from 5,000 to 200,000 and even more preferably from 50,000 to 175,000. For purposes of this invention, molecular weights are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, with tetrahydrofuran (THF) flowing at a rate of 1 mL/min and heated to a temperature of 35° C. as the eluent.

The bromination reaction is conducted in the presence of a solvent mixture that contains (1) at least one polyhalogenated alkane and/or at least one halogenated aromatic compound and (2) at least one monohalogenated alkane. The mixture is a liquid under the conditions of the bromination reaction.

The polyhalogenated alkane or halogenated aromatic compound is by itself a solvent for the brominated polybutadiene polymer, meaning, for purposes of this invention, the brominated polybutadiene polymer by itself is soluble in the polyhalogenated alkane or halogenated aromatic compound to the extent of at least 10, preferably at least 25 and more preferably at least 50 parts by weight per 100 parts by weight of polyhalogenated alkane or halogenated aromatic compound at 25° C.

A polyhalogenated alkane preferably contains from 1 to 8 carbon atoms, more preferably 1 or 2 carbon atoms, and at least two halogen atoms. The halogen atoms are preferably chlorine and more preferably bromine, although a polyhalogenated solvent may contain two or more different types of halogen atoms, such as one or more chlorines and one or more bromines. The halogen atoms all may be bonded to a single carbon atom, or may be bonded to two or more of the carbon atoms. Preferred polyhalogenated alkanes include dichloromethane, dibromomethane, bromochloromethane, chloroform, carbon tetrachloride, 1,2-dichloroethane, 1,1-dichloroethane, 1,2-dibromoethane, 1,1-dibromoethane, and the like.

Halogenated aromatic compounds that are useful herein may have one or more halogen atoms, which are preferably chlorine and more preferably bromine, and may contain a single or multiple rings. Multiple rings may have fused and/or bridged structures. Examples of useful halogenated aromatic compounds include chlorobenzene, polychlorinated benzenes, bromobenzene, or polybrominated benzenes.

The monohalogenated alkane preferably contains from 1 to 8 carbon atoms, more preferably 1 or 2 carbon atoms, and only one halogen atom. The halogen atom is preferably chlorine and more preferably bromine. Examples of monohalogenated alkane solvents include methyl bromide, methyl chloride, ethyl bromide, ethyl chloride, propyl bromide (any isomer or mixture of isomers), propyl chloride (any isomer or mixture or isomers), and the like.

The ratio of the polyhalogenated alkane or halogenated aromatic compound and the monohalogenated alkane may be from about 3:1 to about 1:3 by weight. If too much of the monohalogenated alkane or halogenated aromatic compound is present, the quaternary ammonium or phosphonium tribromide brominating agent may have only limited solubility in the solvent mixture.

The brominating agent used in this invention is a quaternary ammonium tribromide or a quaternary phosphonium tribromide. Pyridinium tribromide, phenyltrialkylammonium tribromides, benzyltrialkylammonium tribromides and tetraalkylammonium tribromides are suitable quaternary ammonium tribromides. Specific examples include phenyltrimethylammonium tribromide, benzyltrimethylammonium tribromide, tetramethylammonium tribromide, tetraethylammonium tribromide, tetrapropylammonium tribromide, tetra-n-butylammonium tribromide and the like. Suitable quaternary phosphonium tribromides contain a quaternary phosphonium group that can be represented by the formula $R_4P^+$, where each R is a hydrocarbon group. The quaternary phosphonium tribromide may be a tetraalkylphosphonium tribromide, in which case each of the R groups is alkyl. The four R groups can all be the same. Alternatively, there may two, three or even four different R groups attached to the phosphorus atom. The R groups each are preferably alkyl having from one to 20 carbon atoms. The R groups more preferably are alkyl groups having from 1 to 8 carbon atoms. Examples of specific quaternary phosphonium tribromides include tetramethylphosphonium tribromide, tetraethylphosphonium tribromide, tetra(n-propyl)phosphonium tribromide, tetra(n-butyl)phosphonium tribromide, tetrahexylphosphonium tribromide, tetraoctylphosphonium tribromide, trihexyltetradecylphosphonium tribromide and the like, or mixtures thereof.

The quaternary ammonium tribromide or quaternary phosphonium tribromide brominating agent can be prepared by mixing the corresponding quaternary ammonium or quaternary phosphonium monobromide salt with elemental bromine. The monobromide salt is usually water-soluble and is often available commercially as an aqueous solution, so a convenient way of making the tribromide is to add elemental bromine to an aqueous solution of the monobromide salt. This reaction proceeds well at approximately room temperature, but higher or lower temperatures can be used if desired. The tribromide tends to precipitate from the aqueous phase, and so may be recovered from the liquid phase by any convenient solid-liquid separation method. The tribromide is soluble in organic solvents such the polyhalogenated alkanes and halogenated aromatic compounds described above, and may be dissolved in such a solvent if desired to facilitate blending with the starting butadiene polymer. In an alternative approach, the neat monobromide salt can be treated with elemental bromine in an organic solvent, without the presence of water.

In addition, the tribromide may be formed in situ in the presence of the solvent mixture and/or the starting butadiene polymer, as described more fully below. This process has the advantage of using less of the expensive compound that serves to carry the bromine added to the polymer and is preferred.

The reaction is conducted by mixing the starting butadiene polymer, solvent mixture and quaternary ammonium tribromide or quaternary phosphonium tribromide together and allowing the mixture to react until the desired proportion of butadiene units have been brominated. The order of addition is not especially important, except that if the tribromide and starting butadiene polymer are mixed first, it is preferred to add the solvent mixture before significant reaction occurs.

The solvent mixture is used in quantities sufficient to dissolve the starting butadiene polymer. The concentration of the starting butadiene polymer in the solvent mixture may range from, for example, 1 to 50% by weight, especially from 5 to 35% by weight. About 0.5 to about 5 moles of the tribromide brominating agent are suitably used per mole of butadiene units in the starting polymer; a more suitable amount is from about 0.9 to about 2.5 moles/mole and an even more suitable amount is from 1 to 1.5 moles/mole.

Generally, only mild conditions are needed to effect the bromination. Bromination temperatures can range from −20 to 100° C., and are preferably from 0 to 85° C. and especially from 10 to 40° C. Temperatures higher than 100° C. could be used, but are not necessary and may lead to a loss of selectivity and/or an increase in by-products. The tribromide becomes converted to the corresponding quaternary ammonium or quaternary phosphonium monobromide salt as the reaction proceeds.

The time of the reaction is sufficient to achieve the desired amount of bromination. Typically, bromination occurs on at least 25% of the butadiene units in the starting butadiene polymer. More preferably, at least 50% and more preferably at least 70% and even more preferably at least 80% or even at least 90% of the butadiene units are brominated. An advantage of this invention is that the bromination reaction continues to proceed rapidly even after 50% or more or even 70% or more of the butadiene units have become brominated, and so the process is capable of producing highly brominated butadiene polymers using commercially reasonable reaction times. The extent of bromination can be determined using proton NMR methods. Residual double bond percentage, polymerized styrene monomer content and 1,2 isomer content can be determined by comparing integrated areas of signals due to appropriate protons (residual double bond protons are between 4.8 and 6 ppm) (relative to tetramethylsilane (TMS)), styrene aromatic protons are between 6.2-7.6 ppm, and protons for brominated polybutadiene are between 3.0 and 4.8 ppm). A Varian INOVA™ 300 NMR spectrometer or equivalent device is useful for such determinations, being operated with a delay time of 30 seconds to maximize relaxation of protons for quantitative integrations. A deutero-substituted solvent such as deutero-chloroform or $d_5$-pyridine is suitable for diluting the sample for NMR analysis.

In certain embodiments of the invention, the tribromide brominating agent is formed in situ in the reaction mixture by separately adding elemental bromine and the corresponding quaternary ammonium monobromide salt or quaternary phosphonium monobromide salt. It is believed that the bromine and monobromide salt form the tribromide upon being mixed together, with the resulting tribromide then reacting with the starting butadiene polymer to brominate the polymer and regenerate the monobromide salt. As elemental bromine is consumed in this reaction sequence, more bromine may be added to the reaction mixture continuously or intermittently to reproduce the tribromide and maintain the reaction.

The ability to form the tribromide brominating agent in situ lends itself to the operation of a continuous or semi-continuous process, in which elemental bromine is fed into a reaction mixture continuously or in any number of stages, as the tribromide is consumed in the reaction and the monobromide salt is regenerated. The elemental bromine combines with the regenerated monobromide salt to re-form the tribromide.

With this invention, the brominated butadiene polymer preferably remains soluble in the reaction mixture as the bromination reaction proceeds, forming little or no separate, highly concentrated phase in which the tribromide brominating agent is poorly soluble. Therefore, the tribromide brominating agent tends to remain in the same organic phase as the brominated butadiene polymer, until the reaction is completed. The quaternary ammonium or quaternary phosphonium monobromide salt that is formed in the reaction is usually poorly soluble in the solvent mixture, and in most cases will form a precipitate. The precipitated monobromide salt is easily recovered using any convenient liquid/solid separation method such as filtration or centrifugation. If desired, the organic phase can be washed with water or other solvent for the monobromide salt to recover any of the monobromide salt that remains in the organic phase.

The brominated butadiene polymer can be recovered readily from the solvent mixture through a suitable method such as distillation of the solvent or addition of an anti-solvent that causes the brominated polymer to become insoluble and precipitate. Examples of such anti-solvents include lower alcohols such as methanol, ethanol and 1-propanol, 2-propanol, n-butanol, and t-butanol. Residual amounts of monobromide salt may be extracted into the anti-solvent in such a case.

The recovered polymer may be purified to remove residual bromine, any residual brominating agent, solvent and by-products as desired or needed for a particular application. Bromide salts may be removed by passing the polymer through silica gel or an ion exchange resin bed.

The process of the invention tends to produce brominated polymer products that have excellent thermal stability. A useful indicator of thermal stability is a 5% weight loss temperature, which is measured by thermogravimetric analysis as follows: 10 milligrams of the polymer is analyzed using a TA Instruments model Hi-Res TGA 2950 or equivalent device, with a 60 milliliters per minute (mL/min) flow of gaseous nitrogen and a heating rate of 10° C./min over a range of from room temperature (nominally 25° C.) to 600° C. The mass lost by the sample is monitored during the heating step, and the temperature at which the sample has lost 5% of its weight at 100° C. is designated the 5% weight loss temperature (5% WLT). This method provides a temperature at which a sample undergoes a cumulative weight loss of 5 wt %, based on sample weight at 100° C. The brominated polymer preferably exhibits a 5% WLT of at least 200° C. The 5% WLT is preferably at least 220° C., more preferably at least 230° C., even more preferably at least 240° C., and still more preferably at least 250° C. Brominated polymers in which at least 70% of the butadiene units have been brominated, and which have such 5% WLT values, are of particular interest.

A further increase in thermal stability is sometimes seen if the brominated butadiene polymer is treated with an alkali metal base. The alkali metal base may be, for example, a hydroxide or a carbonate. The alkali metal base is preferably an alkali metal alkoxide, as the alkali metal alkoxides tend to provide more of an increase in thermal stability than do some other bases, such as alkali metal hydroxides, carbonates or carboxylates. The alkali metal can be lithium, sodium, potassium or cesium. Lithium, sodium and potassium are preferred. The base is an alkali metal alkoxide in preferred embodiments. The alkoxide ion can contain from 1 to 8, preferably from 1 to 4, carbon atoms, with methoxide and ethoxide being especially preferred. Especially preferred alkali metal alkoxides are lithium methoxide, sodium methoxide, potassium methoxide, lithium ethoxide, sodium ethoxide and potassium ethoxide. The brominated butadiene polymer can be treated with as little as 0.01 mole of the alkali metal base per mole of polymerized butadiene units in the polymer (whether brominated or unbrominated). There is no upper limit on the amount of alkali metal base, although cost and handling considerations mitigate against using more than about 1 mole of the alkali metal base per mole of polymerized (brominated or unbrominated) butadiene units in the polymer. A preferred amount is from 0.03 to 0.50 moles/mole of polymerized (brominated or unbrominated) butadiene units, and an especially preferred amount is from 0.05 to 0.20 moles/mole.

The brominated polymer is useful as a flame retardant additive for a variety of organic polymers. Organic polymers of interest include vinyl aromatic or vinyl aromatic polymers (including vinyl aromatic homopolymers, vinyl aromatic copolymers, or blends of one or more vinyl aromatic homopolymers and/or vinyl aromatic copolymers), as well as other organic polymers in which the brominated polymer is soluble or can be dispersed to form domains of less than 10 μm, preferably less than 5 μm, in size. Enough of the brominated polymer is preferably present in the blend to provide the blend with a bromine content within a range of from 0.1 percent by weight to 25 percent by weight, based upon blend weight.

The organic polymer containing the brominated polymer may be cellular. Extruded foams are of particular interest herein, as an advantage of the brominated polymer is that it is highly stable to the conditions of extrusion.

Blends of the brominated polymer may include other additives such as other flame retardant additives, flame retardant adjuvants, thermal stabilizers, ultraviolet light stabilizers, nucleating agents, antioxidants, foaming agents, acid scavengers and coloring agents.

The following examples are provided to illustrate the invention, but not to limit the scope thereof. All parts and percentages are by weight unless otherwise indicated.

EXAMPLE

A 96,300 $M_w$ (weight average molecular weight) styrene-butadiene-styrene triblock rubber with composition of 30 wt % polystyrene and 70% butadiene, of which 83% is in the form of the 1,2-isomer, is brominated. This starting material contains 12.6 mmole of double bonds per gram. A solution of 7.0 g of the triblock rubber in 60 mL of a 50/50 by weight mixture of dichloromethane and ethyl bromide is heated to reflux, while a solution of bromine (14.9 g, 0.0933 mole) and tetraethylammonium bromide (23.5 g. 0.112 mole) in 30 mL of the same solvent mixture is added over a 10-minute period. The resulting mixture is heated to reflux and mechanically stirred (250 rpm) for 2 hours, during which time a precipitate forms. 50 mL of water is added and the mixture is stirred at reflux for another two hours. The stirring is stopped and the reaction mixture is allowed to separate into an aqueous phase and an organic phase. Only a single organic phase is evident throughout the reaction. The aqueous and organic phases are separated, and the organic phase is washed with a mixture of 60 mL of water and 8 mL of a 10% aqueous sodium bisulfite solution, and again with 70 mL of water. 500 mL of isopropanol are added to the washed organic phase to precipitate the polymer. The polymer is collected by filtration and then dried. NMR reveals that 99% of the double bonds in the starting rubber have been brominated. Its 5% weight loss temperature is 254° C.

What is claimed is:

1. A process for forming a brominated butadiene polymer comprising reacting a butadiene polymer containing aliphatic carbon-carbon double bonds with a quaternary ammonium tribromide or a quaternary phosphonium tribromide, in the presence of a solvent mixture containing at least one polyhalogenated compound selected from dichloromethane, dibromomethane, bromochloromethane, 1,2-dichloroethane, 1,1-dichloroethane, 1,2-dibromoethane 1,1-dibromoethane, or a mixture of two or more thereof, and at least one monohalogenated alkane, wherein the ratio of the polyhalogenated compound and the monohalogenated alkane is from about 3:1 to about 1:3 by weight, to form a solution of the brominated butadiene polymer in the solvent mixture and a quaternary ammonium monobromide salt or quaternary phosphonium monobromide salt as a by-product.

2. The process of claim 1 wherein the monohalogenated alkane contains from 1 to eight carbon atoms.

3. The process of claim 2 wherein the halogen atoms of the monohalogenated alkane are chlorine or bromine.

4. The process of claim 3 wherein the monohalogenated alkane is methyl bromide, ethyl bromide or propyl bromide, or a mixture of two or more thereof.

5. The process of claim 4, wherein the butadiene polymer is a butadiene/vinyl aromatic copolymer.

6. The process of claim 5, wherein the butadiene polymer is a styrene/butadiene block copolymer.

7. The process of claim 6, wherein at least 70% of the butadiene units of the butadiene polymer are brominated.

8. The process of claim 7, wherein at least 90% of the butadiene units of the butadiene polymer are brominated.

9. The process of claim 8, wherein at least 95% of the butadiene units of the butadiene polymer are brominated.

* * * * *